United States Patent [19]

Bulliot

[11] 4,018,062
[45] Apr. 19, 1977

[54] DEVICES FOR CONNECTING TWO CO-AXIAL SHAFTS FOR ROTATION AND IN THE AXIAL DIRECTION

[75] Inventor: Georges Léon Marcel Bulliot, Illzach, France

[73] Assignee: Societe Alsacienne de Constructions Mecaniques de Mulhouse, Mulhouse Cedex, France

[22] Filed: June 10, 1975

[21] Appl. No.: 585,565

[30] Foreign Application Priority Data

June 27, 1974 France .............................. 74.22385

[52] U.S. Cl. .......................................... 64/7; 64/6; 64/8; 64/9 R
[51] Int. Cl.² .......................................... F16D 3/02
[58] Field of Search .................... 64/9, 8, 7, 6, 2 P

[56] References Cited

UNITED STATES PATENTS

| | | | |
|---|---|---|---|
| 2,769,323 | 11/1956 | O'Malley | 64/8 |
| 2,893,222 | 7/1959 | Albedyhl et al. | 64/7 |
| 2,924,954 | 2/1960 | Panhard | 64/9 |
| 2,945,364 | 7/1960 | Marquis et al. | 64/8 |
| 3,815,380 | 6/1974 | Esmag | 64/9 |
| 3,826,108 | 7/1974 | Bradct, Jr. et al. | 64/8 |

Primary Examiner—Samuel Scott
Assistant Examiner—Randall Heald
Attorney, Agent, or Firm—Holman & Stern

[57] ABSTRACT

A coupling for joining two co-axial shafts, for both rotation and in the axial direction, comprising a male part integral with one of said shafts, a set of teeth for rotatably driving on said male part, a female part on the other of said shafts, a conjugate set of teeth on said female part, said one part being engaged in said other part with a certain amount of radial play which allows the axis of the set of teeth of the male part the function of pivoting slightly with respect to the axis of the set of teeth of the female part, and means for axial interconnection of the two shafts, said means comprising a ball carried by the end of said one shaft adjacent said male part, two cups axially connected to said other shaft, and having conjugate surfaces between in which said ball is closely held, means mounting said cups in such a manner that said cups are slightly displaceable in the radial direction relative to said other shaft, the two sets of teeth having profiles which permit the axes of the two shafts to pivot slightly relative to one another about a point which is at the center of the sets of teeth and which also permits the two shafts to transmit torque under the right conditions.

5 Claims, 1 Drawing Figure

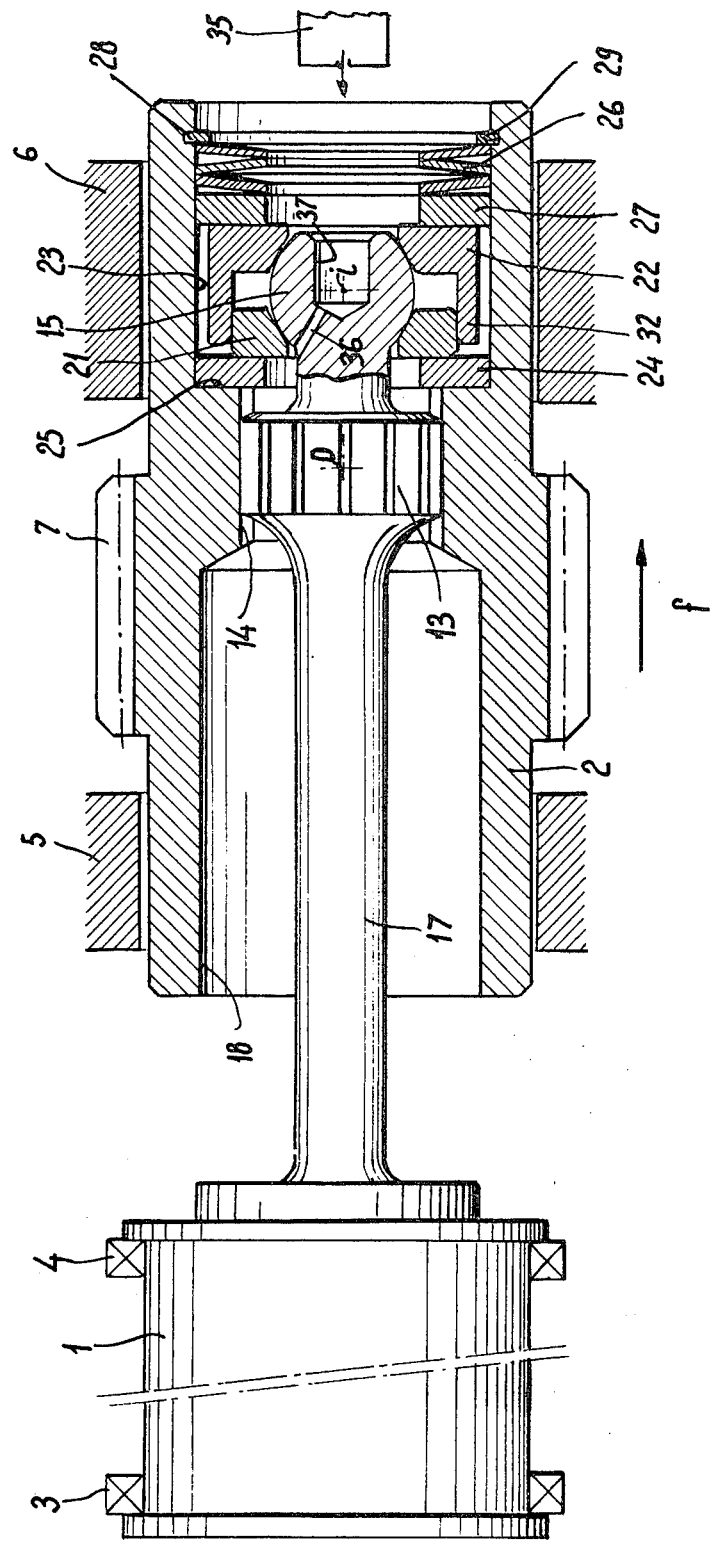

DEVICES FOR CONNECTING TWO CO-AXIAL SHAFTS FOR ROTATION AND IN THE AXIAL DIRECTION

FIELD OF THE INVENTION

This invention relates to devices for connecting two co-axial shafts for rotation and in the axial direction.

BACKGROUND OF THE INVENTION

More often than not, the positioning of the two shafts is assured, for each of them, by two bearings, namely: a first bearing solely for radial positioning and a second bearing for both radial and axial positioning. However, this answer to the problem does not always afford complete satisfaction, especially when the shafts rotate at high speed, as it necessitates, in fact, two axial stops which give rise to losses of power and necessitate consumption of lubricating oil. Moreover, the coupling device itself sometimes gives rise to parasitic axial forces of such a character as cause exceptional wear and tear to the stops.

Another current arrangement consists in providing axial stops on one only of the two shafts, while the coupling device is formed and arranged both to transmit the torque and to assure the axial connection between the two shafts. This arrangement thus enables the number of thrust bearings to be reduced and, moreover, it assures more or less a balancing of the axial forces between the two shafts, while greatly reducing the consumptions of power and of oil. There are numerous coupling devices of this kind in which the transmission of the torque is effected generally by sets of teeth, while the axial connection is assured by arrangements with or without play and, should the occasion arise, comprising resilient arrangements. However, they are relatively complicated and cumbersome.

SUMMARY AND OBJECTS OF THE INVENTION

The object of the invention is to provide a coupling device of the kind which has just been pointed out last of all and which does not present the disadvantages aforesaid.

The coupling device according to the invention comprises a male part with a set of teeth for rotatably driving integral with the first shaft and engaged with some radial play in a female part with a conjugate set of teeth integral with the second shaft, and members for axial interconnection of the two shafts. According to the invention, the members for axial interconnection are constituted by a ball carried by the first shaft adjacent said male part and held close between the conjugate surfaces of two cups axially connected to the second shaft and slightly displaceable in the radial direction relative to the latter.

In addition to the advantages inherent in the kind of coupling to which it appertains, the device according to the invention presents the advantage of being simple and of little bulk.

Further objects and advantages will become apparent upon a consideration of the following description when taken in conjunction with the accompanying drawing of an exemplary embodiment, and comprising part of the description.

DESCRIPTION OF THE FIGURE OF THE DRAWING

The sole FIGURE comprises, in longitudinal section, a coupling according to the invention.

DESCRIPTION OF THE PREFERRED EMBODIMENT

The coupling device shown on the drawing is intended to ensure the joining of two co-axial shafts 1, 2 both for rotation and in the axial direction. The shaft 1 is positioned in the radial direction and in the axial direction by suitable bearings which are represented only schematically at 3 and 4. The shaft 2 is positioned only in the radial direction by means of two bearings represented schematically at 5 and 6. In the example, the shaft 2 serves as nave of a toothed pinion 7 for transmission of power.

Coupling for rotation is ensured by a system of conjugate sets of teeth 13, 14 integral, respectively, with the two shafts and the axial coupling by a device which includes a ball 15.

The set of teeth 13, for example of involute profile, is cut into a male part of a flexible extension 17 of the shaft 1 and is engaged, with some play in the radial direction only, in the conjugate set of teeth 14 cut into a narrow part of a bore 18 on the shaft 2. The set of teeth 13 may undergo slight axial displacements relative to the set of teeth 14.

The play existing between the male set of teeth 13 and the female set of teeth 14 permits the axis of the set of teeth 13 to pivot slightly about the center O of the sets of teeth with respect to the axis of the shaft 2, although the torque could be transmitted in better conditions.

The ball 15 is integral with the male part which carries the set of teeth 13 and is located quite close to the latter. It is placed between two cups 21, 22 which are displaceable both in the radial direction and in the axial direction within a cylindrical cavity 23 in the shaft 2. The cup 21 is supported in the axial direction against a washer 24 which is itself supported against an annular shoulder 25 of the cavity 23 under the action of a spring 26 which is constituted, in the example, by several Belleville washers and which, through the intermediary of another washer 27, thrusts the cup 22 back against the ball 15, by being itself supported against a resilient keeper 28 set in an annular groove 29 in the cylindrical cavity 23.

In order to make the assembling of the ball-and-socket joint possible, the cup 21 is divided, along a diametral plane, into two half-cups retained in place by a tubular part 32 of the other cup 22 which encompasses the periphery of the two-part cup 21.

In order to ensure the lubrication of the ball-and-socket joint, it is provided with an oil spray nozzle 35 arranged along the axis of the cavity 23 of the shaft 2 so as to project a jet of oil on to the ball 15. With the object of ensuring at the same time the lubrication of the sets of teeth 13, 14, there is made at the downstream part of the ball 15 an oblique hole 37 which emerges into an axial blind hole 37 in said ball. Thus part of the oil projected against the ball passes through the holes 37 and 36 and can reach the two sets of teeth 13, 14.

The operation of the coupling is as follows:

The shaft 1 is positioned in the radial direction and in the axial direction at the same time by its two bearings 3 and 4. The shaft 2 is positioned in the radial direction by its two bearings 5 and 6, and in the axial direction by the ball 15 which is unitary with the shaft 1 and which is closed in between the two cups 21, 22, themselves axially positioned in the shaft 2, without axial play, the preclamping afforded by the spring washers being sufficient to prevent the separation of the surfaces in contact, whatever may be the direction and intensity of the axial force, in the normal conditions of operation of the coupling.

The transmission of the torque between the two shafts is effected by the sets of teeth 13, 14. The alignment deficiencies between the two shafts are accurately taken up by the fact that the axes of the two shafts may form between them a small angle on intersecting one another at the center O of the sets of teeth, while the center $i$ of the ball 15 then describes in operation a circumference in a plane perpendicular to the axis of the shaft 2 while causing the two cups 21 and 22 to slide radially against the two supporting washers 22 and 24. All of these movements take place in the right conditions thanks to the lubrication assured by the oil spray nozzle 35 and if care is taken to make a correct choice of the materials used and the treatment of their surfaces in contact as a function of the forces to be transmitted.

The washer 24 could, in a modification, rest against the annular shoulder 25 likewise through the intermediary of springs. It would also be possible not to have any spring at all there.

In another modification, the shaft part 17 which carries the set of teeth 13, instead of being unitary with the shaft 1, could be connected to the latter by a coupling arrangement with sets of teeth and ball similar to that which has just been described, so that this part 17 would then constitute a floating intermediate shaft.

Of course, the invention is not limited to the embodiment described and shown and modifications could be introduced thereinto in accordance with the applications contemplated without thereby departing from the scope of the invention.

I claim:

1. A coupling joining two co-axial shafts for rotation and relative axial movement, comprising a male part integral with one of said shafts, a set of teeth for rotatably driving said male part, a female part on the other of said shafts, a conjugate set of teeth on said female part, said one part being engaged in said other part with a certain amount of radial play which allows the axis of the set of teeth of the male part to pivot slightly with respect to the axis of the set of teeth of the female part, and means for axial interconnection of the two shafts, said means comprising a ball carried by the end of said one shaft adjacent said male part, two cups axially connected to said other shaft, said cups having conjugate surfaces between which said ball is closely held, means mounting said cups so that said cups are slightly displaceable in the radial direction relative to said other shaft, the two sets of teeth having profiles which permit the axes of the two shafts to pivot slightly relative to one another about a point which is at the center of the sets of teeth and which also allows the two shafts to transmit torque under the right conditions.

2. Coupling according to claim 1, in which the cups are disposed in a chamber in the second shaft and which chamber has two end faces on which the respective cups rest, and the chamber having one lateral face affording to this chamber a width slightly greater than the width of the cups.

3. Coupling according to claim 2, in which said chamber is cylindrical and co-axial with said second shaft and has two planar faces on which the cups rest, said faces being perpendicular to the axis of said one shaft.

4. Coupling according to claim 3, in which the profiles of the two sets of teeth are curvilinear conjugate profiles.

5. Coupling according to claim 4, in which the curvilinear conjugate profiles of the two sets of teeth are in the form of an involute of a circle.

* * * * *